United States Patent
Niezgoda et al.

(10) Patent No.: US 12,533,738 B2
(45) Date of Patent: Jan. 27, 2026

(54) SERVICE TOOL FOR CUTTING AND PLUGGING A UTILITY SERVICE LINE

(71) Applicant: Niezgoda Engineering, LLC, Brewster, MA (US)

(72) Inventors: Brian Niezgoda, Brewster, MA (US); Dean Niezgoda, Brewster, MA (US)

(73) Assignee: Niez Tech LLC, Brewster, MA (US)

( * ) Notice: Subject to any disclaimer, the term of this patent is extended or adjusted under 35 U.S.C. 154(b) by 405 days.

(21) Appl. No.: 18/166,505

(22) Filed: Feb. 9, 2023

(65) Prior Publication Data

US 2024/0271739 A1 Aug. 15, 2024

(51) Int. Cl.

| | |
|---|---|
| *B23D 21/06* | (2006.01) |
| *B23D 21/08* | (2006.01) |
| *B26B 25/00* | (2006.01) |
| *B26D 3/16* | (2006.01) |
| *F16L 55/18* | (2006.01) |

(52) U.S. Cl.
CPC ............. *B23D 21/06* (2013.01); *B23D 21/08* (2013.01); *B26B 25/00* (2013.01); *B26D 3/16* (2013.01); *B26D 3/169* (2013.01); *F16L 55/18* (2013.01)

(58) Field of Classification Search
CPC ........ B23D 21/06; B23D 21/08; B23D 21/00; B23D 21/006; B23D 45/12; B23D 45/16; B23D 57/0084; B26B 25/00; B26D 3/16; B26D 3/169; B26D 3/166; E21B 29/12; E21B 29/08; E21B 29/002; E21B 29/007; E21B 33/00
USPC .............................................. 30/123, 92–97
See application file for complete search history.

(56) References Cited

U.S. PATENT DOCUMENTS

| | | | |
|---|---|---|---|
| 3,672,050 A | * | 6/1972 | Hanback ............... B23D 21/08 72/71 |
| 3,911,574 A | | 10/1975 | Jones |
| 4,307,512 A | | 12/1981 | Phillips |
| 4,576,070 A | | 3/1986 | Fitzgerald |
| 4,932,125 A | | 6/1990 | Poveromo |
| 5,815,926 A | | 10/1998 | Ekern |
| 6,014,810 A | | 1/2000 | Earle et al. |
| 9,784,062 B1 | | 10/2017 | Solis |
| 2003/0221527 A1 | | 12/2003 | Lee |

(Continued)

FOREIGN PATENT DOCUMENTS

| | | |
|---|---|---|
| AU | 2019213450 A1 | 2/2021 |
| AU | 2021101547 A4 | 6/2021 |
| EP | 2461931 B1 | 2/2017 |

*Primary Examiner* — Phong H Nguyen
(74) *Attorney, Agent, or Firm* — The Webb Law Firm

(57) ABSTRACT

A service tool for cutting and plugging a utility service line has a body with a receiving portion configured to receive the utility service line and a clamping mechanism movable relative to the body and configured to clamp around at least a portion of an outer circumference of the utility service line. The service tool further includes a cutting blade disposed in the receiving portion and configured to engage the outer circumference of the utility service line and cut the utility service line into a first cut portion and a second cut portion as the cutting blade is rotated about a cutting axis relative to the body. The service tool further has a hub associated with the body. The hub includes a plugging mechanism configured to displace the first cut portion of the utility service line and dispense a plug into the second cut portion of the utility service line.

20 Claims, 10 Drawing Sheets

(56) References Cited

U.S. PATENT DOCUMENTS

| | | |
|---|---|---|
| 2009/0307910 A1 | 12/2009 | Schlosser |
| 2012/0102753 A1 | 5/2012 | Cosentino |
| 2013/0152401 A1* | 6/2013 | Lee .................. B23D 21/06 30/99 |
| 2023/0211517 A1* | 7/2023 | Su .................... B26D 3/169 83/452 |

* cited by examiner

SERVICE TOOL FOR CUTTING AND PLUGGING A UTILITY SERVICE LINE

BACKGROUND

Technical Field

The present disclosure relates to a service tool for servicing a utility service line. More specifically, the present disclosure relates to a service tool for cutting and plugging a utility service line.

Technical Considerations

Utility service lines, such as water supply lines, require periodic servicing or repair that require an upstream portion of the utility service line to be isolated from a downstream utility service line so that service or repair can be made. Typically, water is turned off at a point upstream of the location where service or repair is necessary to allow the utility service line to be cut. This results in an inconvenience until the service or repair is completed.

There exists a need in the art for a service tool for servicing a utility service line without the need for turning off the upstream water supply.

SUMMARY

In some non-limiting embodiments or aspects, provided is a service tool for cutting and plugging a utility service line. The service tool may include a body having a receiving portion configured to receive the utility service line; a clamping mechanism movable relative to the body and configured to clamp around at least a portion of an outer circumference of the utility service line when the utility service line is received in the receiving portion; a cutting blade disposed in the receiving portion and configured to engage the outer circumference of the utility service line and cut the utility service line into a first cut portion and a second cut portion as the cutting blade is rotated about a cutting axis relative to the body; and a hub associated with the body. The hub may include a plugging mechanism configured to displace the first cut portion of the utility service line and dispense a plug into the second cut portion of the utility service line.

In some non-limiting embodiments or aspects, the clamping mechanism may include at least one jaw movable relative to the body between an open position and a closed position. In the closed position, the at least one jaw may be configured to clamp around at least the portion of the outer circumference of the utility service line. The clamping mechanism may include a threaded drive for moving the at least one jaw relative to the body between the open position and the closed position. A handle may be connected to the body, such that the handle extends in a direction substantially perpendicular to a longitudinal axis of the receiving portion.

In some non-limiting embodiments or aspects, the hub may be connected to the body via a rotatable shaft such that the hub is rotatable relative to the body with rotation of the shaft. The rotatable shaft may include an input drive configured for connecting to a tool for rotating the rotatable shaft. The input drive may be a keyed hole configured for receiving a corresponding protrusion on the tool.

In some non-limiting embodiments or aspects, the plugging mechanism may include a plug chamber offset from the shaft, the plug chamber configured to receive the plug. The hub may be configured to contact the utility service line as the cutting blade is rotated about the cutting axis relative to the body to displace the first cut portion of the utility service line such that the plug chamber is aligned with the second cut portion of the utility service line.

In some non-limiting embodiments or aspects, the plug is disposed in the plug chamber of the plugging mechanism. The plug may be threadably received within the plug chamber.

In some non-limiting embodiments or aspects, the plug may include an inner portion having a plug end with a seal configured for engaging an inner sidewall of the second cut portion of the utility service line and an outer portion threadably connected to a shaft of the inner portion protruding from the plug end. The outer portion may have first threads on an interior thereof configured for threadably connecting to the shaft of the inner portion and second threads on an exterior thereof for threadably connecting to the plug chamber of the plug mechanism.

In some non-limiting embodiments or aspects, a service tool for cutting and plugging a utility service line may include a body having a receiving portion configured to receive the utility service line; a clamping mechanism movable relative to the body and configured to clamp around at least a portion of an outer circumference of the utility service line when the utility service line is received in the receiving portion; a cutting blade disposed in the receiving portion and configured to engage the outer circumference of the utility service line and cut the utility service line into a first cut portion and a second cut portion as the cutting blade is rotated about a cutting axis relative to the body; a hub associated with the body, the hub comprising a plugging mechanism; and a plug received in the plugging mechanism and configured to be dispensed into the second cut portion of the utility service line. The hub may be configured to contact the utility service line as the body is rotated about the utility service line to displace the first cut portion of the utility service line such that the plugging mechanism is aligned with the second cut portion of the utility service line.

In some non-limiting embodiments or aspects, the hub may be connected to the body via a rotatable shaft such that the hub is rotatable relative to the body with rotation of the shaft. The rotatable shaft may include an input drive configured for connecting to a tool for rotating the rotatable shaft.

In some non-limiting embodiments or aspects, the plugging mechanism may include a plug chamber offset from the shaft, the plug chamber configured to receive the plug. The plug may include an inner portion having a plug end with a seal configured for engaging an inner sidewall of the second cut portion of the utility service line and an outer portion threadably connected to a shaft of the inner portion protruding from the plug end. The outer portion may have first threads on an interior thereof configured for threadably connecting to the shaft of the inner portion and second threads on an exterior thereof for threadably connecting to the plug chamber of the plug mechanism.

BRIEF DESCRIPTION OF THE DRAWINGS

Additional advantages and details are explained in greater detail below with reference to the exemplary embodiments that are illustrated in the accompanying figures, in which.

DETAILED DESCRIPTION

Figure 1:
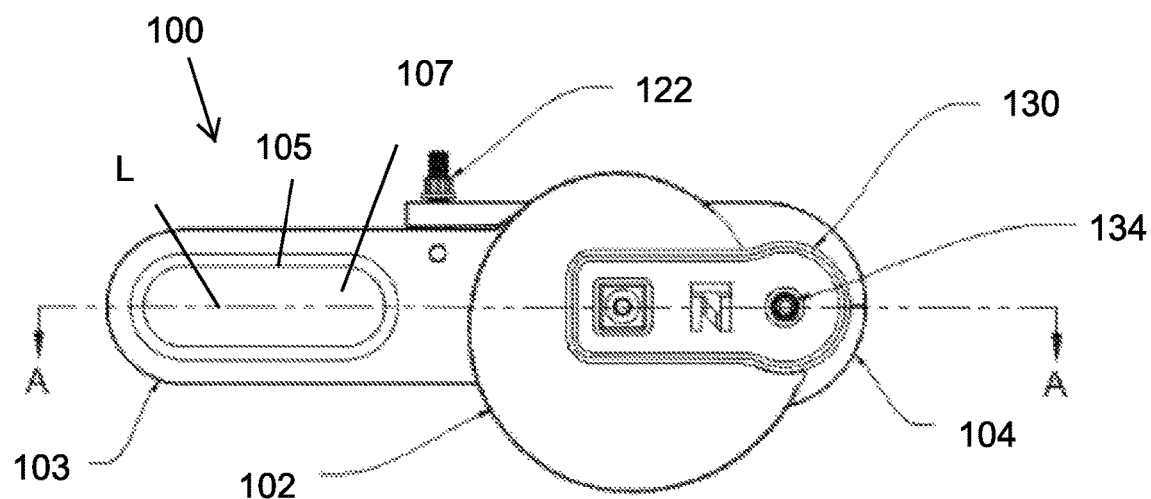
FIG. 1 is a right side view of a service tool for cutting and plugging a utility service line in accordance with one embodiment or aspect of the present disclosure.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

For purposes of the description hereinafter, the terms "end," "upper," "lower," "right," "left," "vertical," "horizontal," "top," "bottom," "lateral," "longitudinal," and derivatives thereof shall relate to embodiments or aspects as they are oriented in the drawing figures. However, it is to be understood that embodiments or aspects may assume various alternative variations and step sequences, except where expressly specified to the contrary. It is also to be understood that the specific devices and processes illustrated in the attached drawings, and described in the following specification, are simply non-limiting exemplary embodiments or aspects. Hence, specific dimensions and other physical characteristics related to the embodiments or aspects of the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." As used in the specification and the claims, the singular form of "a," "an," and "the" include plural referents, such as unless the context clearly dictates otherwise. Additionally, Furthermore, as used herein, the terms "set" and "group" are intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. Further, the phrase "based on" is intended to mean "based at least partially on" unless explicitly stated otherwise. Further, the phrase "based on" may mean "in response to" and be indicative of a condition for automatically triggering a specified operation of an electronic device (e.g., a controller, a processor, a computing device, etc.) as appropriately referred to herein.

All numbers used in the specification and claims are to be understood as being modified in all instances by the term "about". The terms "approximately", "about", and "substantially" mean a range of plus or minus ten percent of the stated value.

As used herein, the term "at least one of" is synonymous with "one or more of". For example, the phrase "at least one of A, B, and C" means any one of A, B, and C, or any combination of any two or more of A, B, and C. For example, "at least one of A, B, and C" includes one or more of A alone; or one or more of B alone; or one or more of C alone; or one or more of A and one or more of B; or one or more of A and one or more of C; or one or more of B and one or more of C; or one or more of all of A, B, and C. Similarly, as used herein, the term "at least two of" is synonymous with "two or more of". For example, the phrase "at least two of D, E, and F" means any combination of any two or more of D, E, and F. For example, "at least two of D, E, and F" includes one or more of D and one or more of E; or one or more of D and one or more of F; or one or more of E and one or more of F; or one or more of all of D, E, and F.

Some non-limiting embodiments or aspects may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Figure 2:
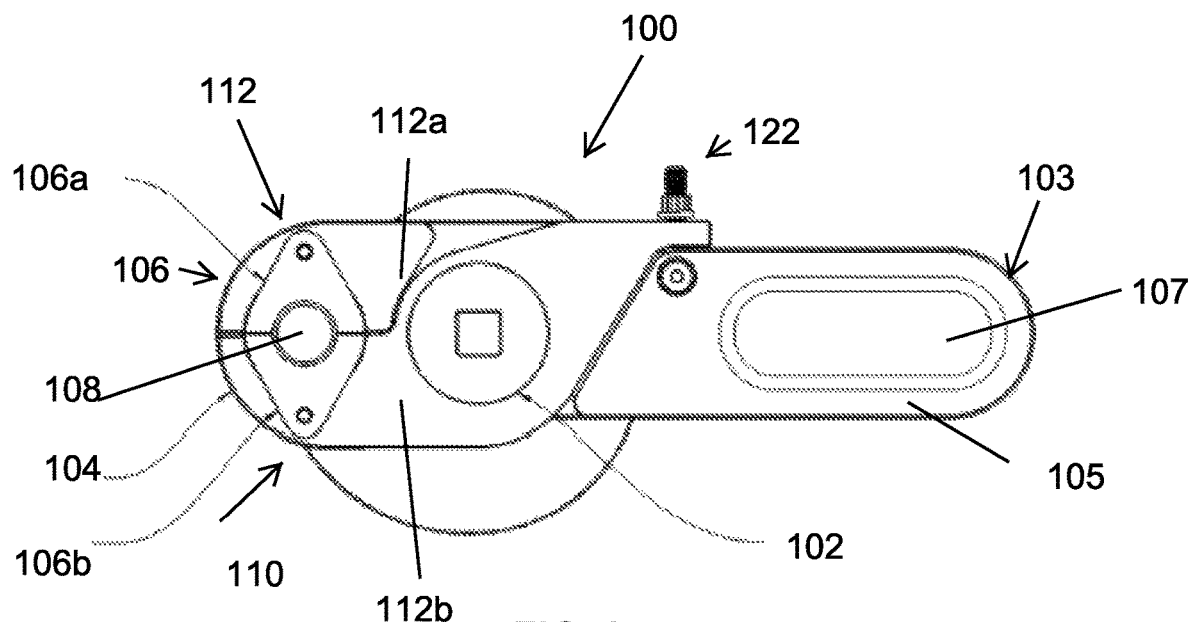
FIG. 2 is a left side view of the service tool shown in FIG. 1.

With reference to FIGS. 1-2, a tool 100 (hereinafter referred to as "tool 100") for cutting and plugging a utility service line 200 (shown in FIG. 6) is shown in accordance with some non-limiting embodiments or aspects of the present disclosure. The utility service line 200 may be a water, gas, or other utility line configured for carrying fluid. The utility service line 200 may be configured for connecting a main line to a residential or commercial building. As described in detail herein, the tool 100 is configured for cutting the utility service line 200 and displacing a first cut portion, such as a downstream portion connected to the residential or commercial building, of the utility service line 200. The tool 100 is further configured to plug the second cut portion, such as an upstream portion connected to the main line. In this manner, the repairs or maintenance can be carried on the utility service line 200 without having to turn off the supply to the main line. In this manner, repairs or maintenance on a single residential or commercial building do not interrupt the water supply of neighboring buildings because the main line can be active during repairs or maintenance.

Figure 5:
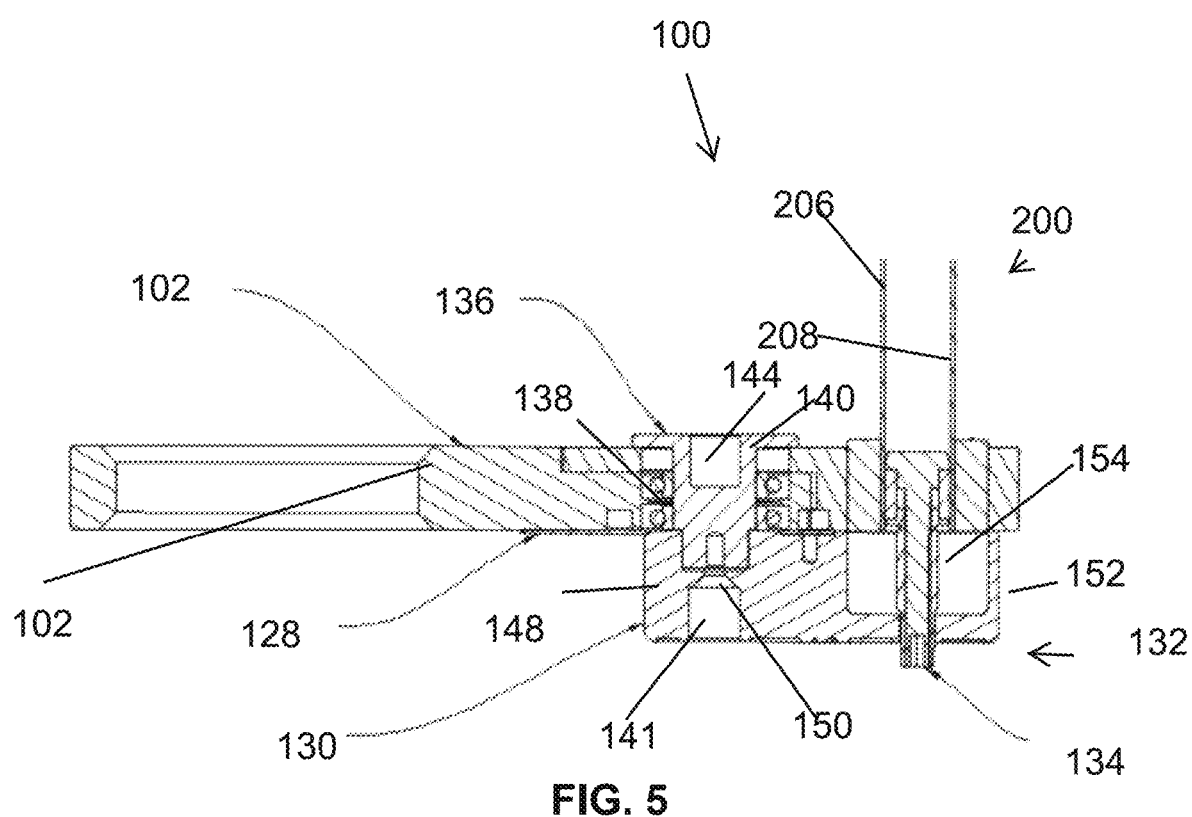
FIG. 5 is a cross-sectional view of the service tool shown in FIG. 1 taken along line A-A.

With reference to FIGS. 2, the tool 100 includes a body 102 having a receiving portion 104 configured to receive the utility service line 200 (shown in FIG. 5). In some embodiments or aspects, the receiving portion 104 extends in a direction that is substantially perpendicular to a longitudinal axis L of the service tool (shown in FIG. 1). The receiving portion 104 is sized to receive an outer circumference of the utility service line 200.

With reference to FIGS. 1-2, the body 102 has a handle 103 for holding the tool 100. The handle 103 may be connected to the body 102 or be monolithically formed with the body 102. In some embodiments or aspects, the handle 103 extends in a direction substantially parallel to a longitudinal axis L of the body. The handle 103 may have a holding portion 105 configured for being gripped by the user while using the tool 100. In some embodiments or aspects, an opening 107 may extend through the holding portion 105.

In some embodiments or aspects, and with reference to FIG. 2, the receiving portion 104 may have a sleeve 106 having a central opening 108 configured to receive the utility service line 200. The sleeve 106 is configured to support the utility service line 200 along a portion of the utility service line 200 that is inserted into the tool 100.

Figure 3:
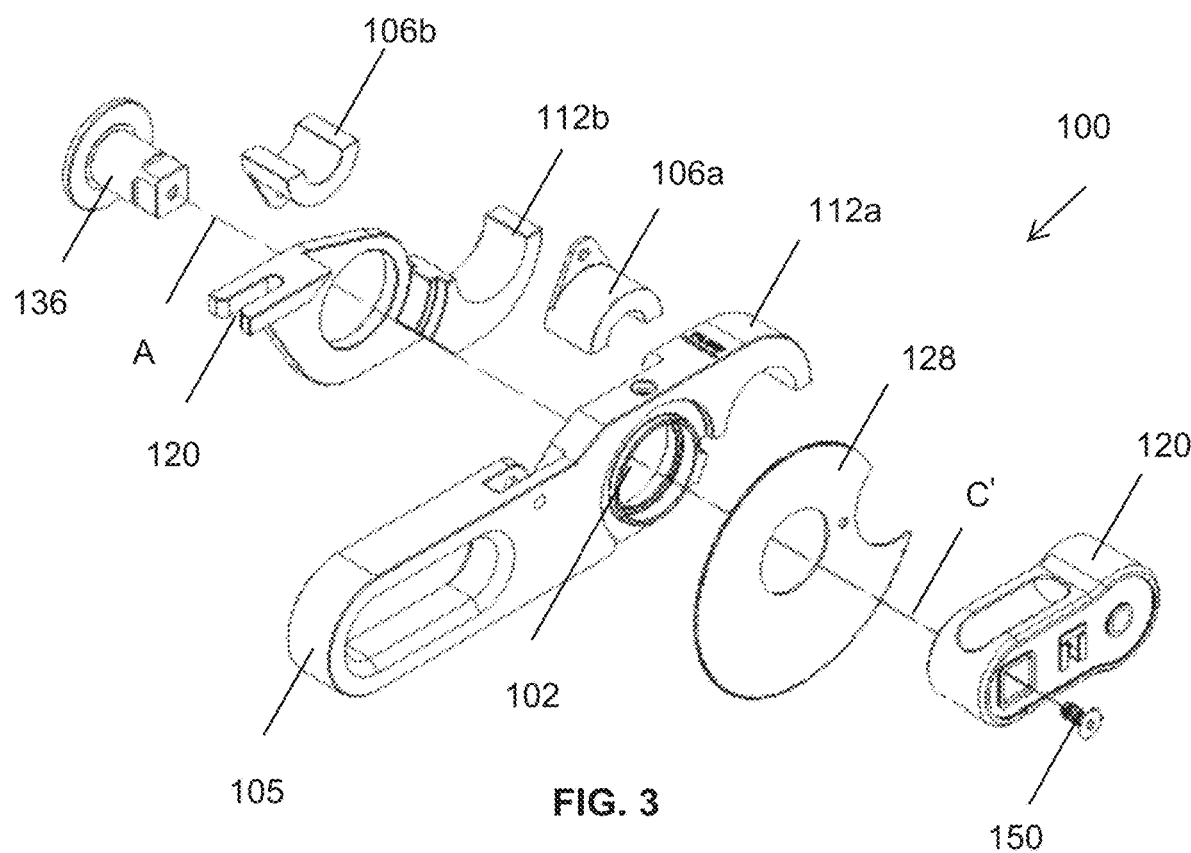
FIG. 3 is an exploded perspective view of the service tool shown in FIG. 1.

With reference to FIG. 3, the sleeve 106 may be removably connectable to the receiving portion 104. In this manner, a plurality of different sleeves 106 having different-sized central openings 108 can be connected to the receiving portion 104 in order to accommodate different-sized utility service lines 200. For example, a sleeve 106 having a 1" central opening 108 may be connected to the body 102 of the tool 100 to service a utility service line 200 having a 1" outer diameter. If service or maintenance is required on a utility service line 200 having a larger diameter, such as 1.5", 2", or other outer diameter, a sleeve 106 having an appropriately sized central opening 108 may be connected to the body 102.

With reference to FIGS. 2-3, the sleeve 106 may be split into two portions to allow the utility service line 200 to be inserted into the receiving portion 104. For example, the sleeve 106 may have a first sleeve portion 106a associated with a first portion of the body 102 and a second sleeve portion 106b associated with a second portion of the body 102. The first and second sleeve portions 106a, 106b may be movable relative to each other to permit insertion of the utility service line 200 into the central opening 108 of the sleeve 106. The first and second sleeve portion 106a, 106b can be clamped together after the utility service line 200 is inserted into the central opening 108.

With continued reference to FIG. 2, the tool 100 may have a clamping mechanism 110 movable relative to the body 102 and configured to clamp around at least a portion of an outer circumference of the utility service line 200 (shown in FIG. 5) when the utility service line 200 is received in the receiving portion 104, such as the central opening 108 of the sleeve 108. The clamping mechanism 110 has at least one jaw 112 movable relative to the body 102 between an open position (shown in FIG. 7) and a closed position (shown in FIG. 4). In the open position, the clamping mechanism 110 is configured to permit insertion of the tool 100 around the utility service line 200. For example, the at least one jaw 112 may be opened to widen the central opening 108 such that the tool 100 can be fitted around the utility service line 200. In the closed position, the clamping mechanism 110 is secured to be in close physical contact with the outer surface of the portion of the utility service line 200 that is received within the central opening 108. For example, the at least one jaw 112 may be closed to enclose the central opening 108 and clamp around at least the portion of the outer circumference of the utility service line 200.

Figure 6:
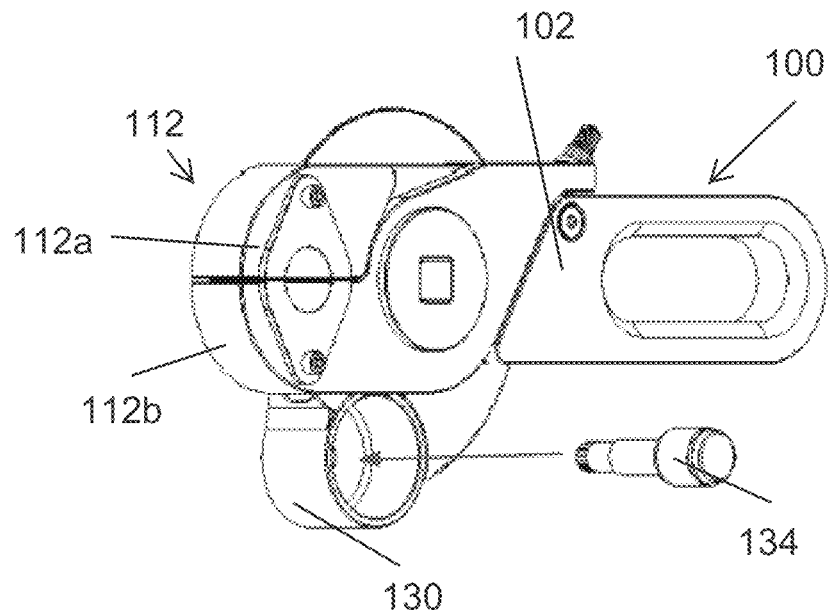
FIG. 6 is a perspective view of the service tool of FIG. 1 showing an installation of a plug.
Figure 7:
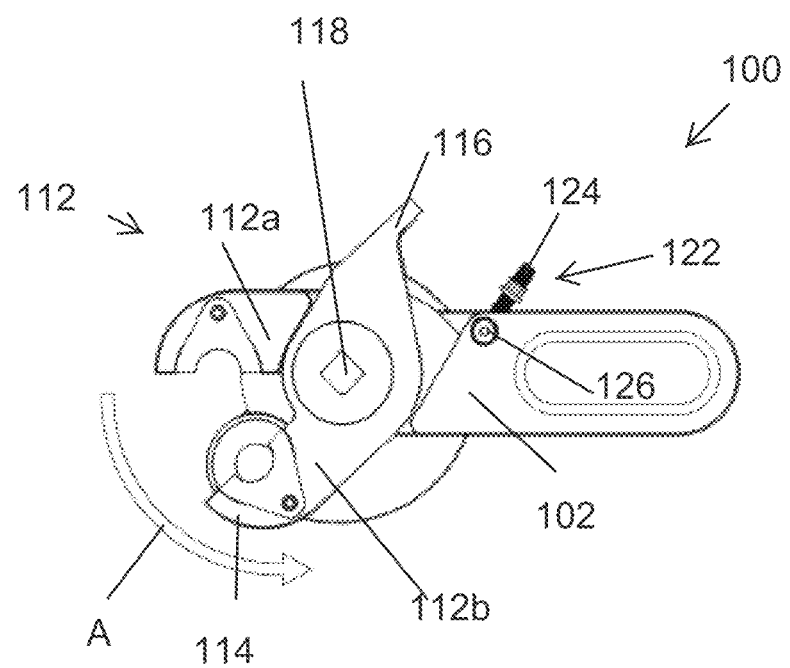
FIG. 7 is a left side view of the service tool of FIG. 1 with jaws of the service tool shown in an open position.

With reference to FIGS. 6-7, the at least one jaw 112 of the clamping mechanism 110 may be a first fixed jaw 112a and a second movable jaw 112b. The first fixed jaw 112a is fixed relative to the body 102 while the second movable jaw 112b is movable relative to the body 102 and the first fixed jaw 112a in a direction of arrow A. In some embodiments or aspects, the at least one jaw 112 may have a pair of movable jaws (not shown), both of which are movable relative to the body 102 and in opposite directions relative to each other.

With reference to FIG. 7, the second movable jaw 112b has a first end 114 configured for contacting the utility service line 200 and a second end 116 opposite the first end 114. The second movable jaw 112b may be pivotally connected to the body 102 at a first pivot point 118 such that the second movable jaw 112b is pivotable in the direction of arrow A relative to the body 102 and the first fixed jaw 112a about a pivot axis defined by the first pivot point 118.

Figure 8:
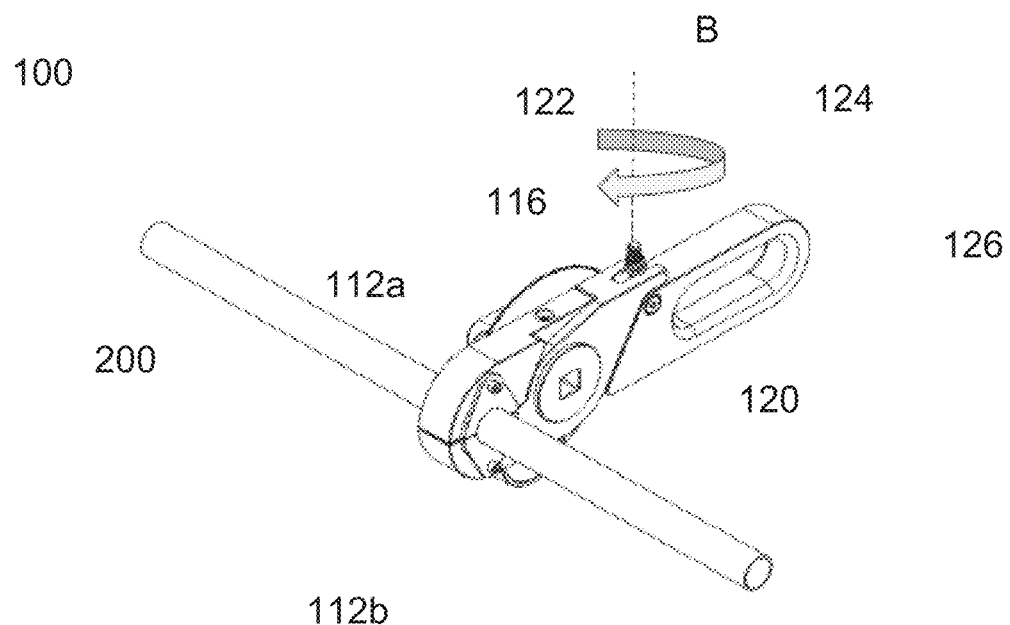
FIG. 8 is a left-side perspective view of the service tool of FIG. 1 shown on a utility line.

With reference to FIG. 8, the second end 116 of the second movable jaw 112b has a slot 120 configured to engage a clamping device 122. In some embodiments or aspects, the clamping device 122 includes a threaded shaft 124 connected to the body 102. The threaded shaft 124 may be pivotally connected to the body 102 about a second pivot point 126 (shown in FIG. 7) such that the threaded shaft 124 is pivotally movable relative to the body 102.

In order to secure the second movable jaw 112b relative to the body 102, the threaded shaft 124 is pivoted in a direction away from the second movable jaw 112b such that the second end 116 of the second movable jaw 112b can be moved to the closed position against the body 102 (FIG. 8). Once the second movable jaw 112b is in the closed position, the threaded shaft 124 is pivoted in a reverse direction toward the second movable jaw 112b such that the threaded shaft 124 is received in the slot 120 of the second movable jaw 112b. A nut 126 is provided on the threaded shaft 124 to clamp the second movable jaw 112b in the closed position between the nut 126 and the body 102 of the tool 100. The second movable jaw 112b can be unclamped by releasing the nut 126 and pivoting the threaded shaft 124 out of the slot 120.

Figure 4:
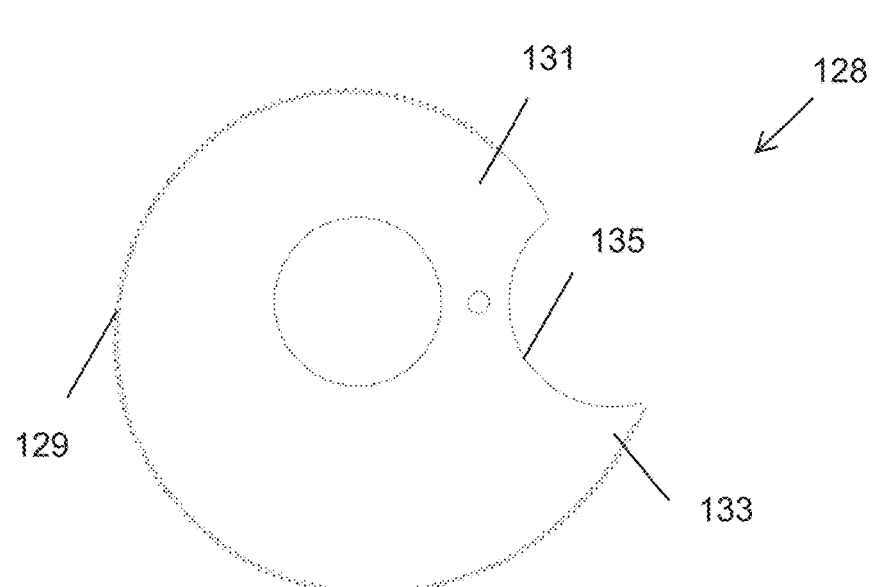
FIG. 4 is a side view of a cutting blade for use with the service tool shown in FIG. 1.

With reference to FIGS. 3-4, the tool 100 includes a cutting blade 128 configured to engage an outer surface 202 of the utility service line 200 and cut through the utility service line 200. In some embodiments or aspects, the cutting blade 128 is rotatable relative to the body 102 about a cutting axis C'. In order to cut the utility service line 200, the utility service line 200 is clamped in the receiving portion 104 using the clamping mechanism 110 and the cutting blade 128 is rotated about the cutting axis C'.

With reference to FIG. 4, the cutting blade 128 has a plurality of cutting teeth 129 extending along at least a portion of an outer perimeter thereof. The cutting teeth 129 are configured to score and cut through the sidewall of the utility service line 200. The cutting blade 128 has an asymmetrical shape relative to the cutting axis C such that the cutting blade 128 is urged closer toward the utility service line 200 as the blade is rotated about the cutting axis C'. The cutting blade 128 has a first end 131 that is configured to contact an outer surface of the utility service line 200, a second end 133 that is configured to cut through the utility service line 200 and a plug notch 135 between the first and second ends. The cutting blade 128 is configured to cut the utility service line 200 into a first cut portion 204 and a second cut portion 206 as the cutting blade 128 is rotated about the cutting axis C'.

With reference to FIG. 1, the tool 100 has a hub 130 associated with the body 102. The hub 130 is connected to the body 102 via a rotatable shaft 136 such that the hub 130 is rotatable relative to the body 102 with rotation of the rotatable shaft 136. The cutting blade 128 is also operatively connected to the rotatable shaft 136 such that the cutting blade 128 is also rotatable with rotation of the rotatable shaft 136.

With reference to FIG. 5, the hub 130 has a plugging mechanism 132 configured to displace the first cut portion 204 of the utility service line 200 and dispense a plug 134 into the opening of the second cut portion 206. The hub 130 is configured to contact the utility service line 200 as the body 102 of the tool 100 is rotated about the utility service line 200 to displace the first cut portion 204 of the utility service line 200 such that the plug 134 is aligned with the second cut portion 206. The rotatable shaft 136 may be rotatably supported within the body 102 by at least one bearing 138. The rotatable shaft 136 has an input drive 140 configured for connecting to a tool for rotating the rotatable shaft 136. In some embodiments or aspects, the input drive 140 may be a keyed hole 144 configured for receiving a corresponding protrusion on the tool. The rotatable shaft 136 can be rotated about its rotation axis A (shown in FIG. 5) by engaging the keyed hole 144 of the input drive 140 with the protrusion of the tool and rotating the tool. In some embodiments or aspects, the tool may be an impact gun or a wrench. The rotation axis A of the rotatable shaft 136 is coaxial with the cutting axis C' of the cutting blade 128.

With continued reference to FIG. 5, the hub 130 has a first end 148 connected to the rotatable shaft 136 by a fastener 150 and a second end 152 offset from the first end 148 and the rotatable shaft 136. The first end 148 may have a second input drive 141 that corresponds to the input drive 140 on the rotatable shaft 136. The second end 152 of the hub 130 may have a plug chamber 154 for receiving the plug 134 (also shown in FIG. 6). The plug chamber 154 may be aligned with the plug notch 135 on the cutting blade 128. In some embodiments or aspects, the plug chamber 154 may be threaded such that the plug 134 can be threadably connected to the second end 152 of the hub 130.

Figure 17:
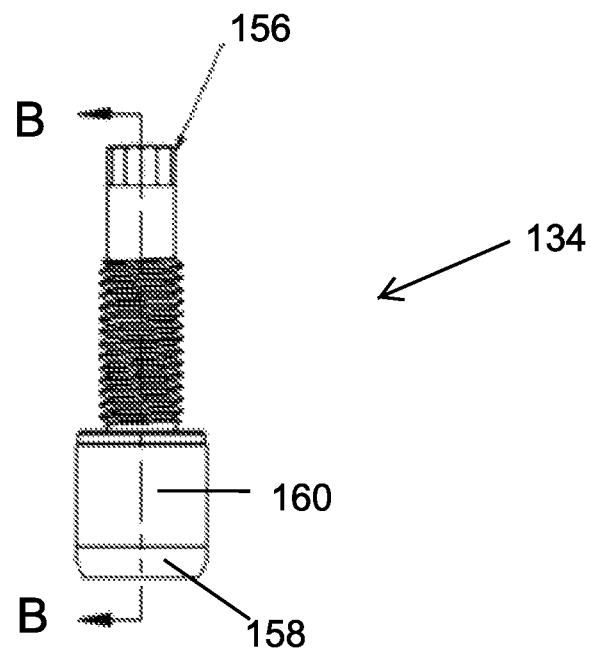
FIG. 17 is a side view of a plug configured for use with the service tool of FIG. 1.
Figure 18:
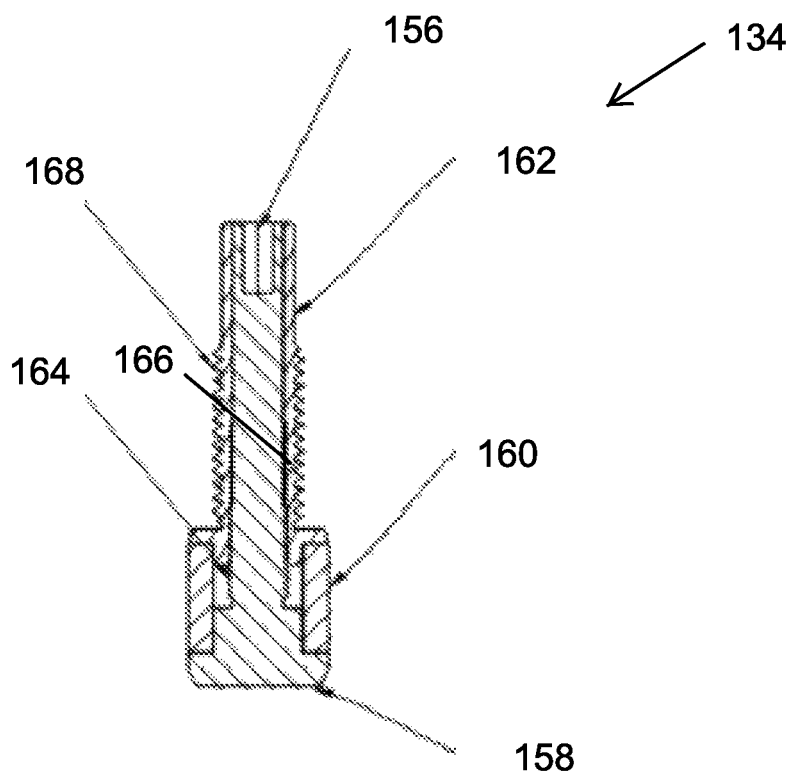
FIG. 18 is a side cross-sectional view of the plug shown in FIG. 17 taken along line B-B.

With reference to FIGS. 17 and 18, the plug 134 has an inner portion 156 having a plug end 158 with a seal 160 configured for engaging an inner sidewall 208 of the second cut portion 206 of the utility service line 200 (shown in FIG. 5). The plug 134 further has an outer portion 162 threadably connected to a shaft 164 of the inner portion 156 protruding from the plug end 158. The inner and outer portions 156, 162 are movable relative to each other such that the seal 160 is compressible between them. Compression of the seal 160 causes it to expand in a radially outward direction such that the seal 160 can engage the inner surface of the utility service line 200 to seal the utility service line 200. The outer portion 162 has first threads 166 on an interior thereof configured for threadably connecting to the shaft 164 of the inner portion 156. The outer portion 162 further has second threads 168 on an exterior thereof for threadably connecting to the plug chamber 154 of the hub 130 (shown in FIG. 3).

Having described the structure of the tool 100, a method of using the tool 100 to cut and plug the utility service line 200 will now be described with reference to FIGS. 6-16. With reference to FIG. 6, prior to use of the tool 100, the plug 134 is loaded into the plugging mechanism 132 of the hub 130. For example, the plug 134 can be loaded by threadably engaging the second threads 168 on the outer portion of the plug 134 with the threads on the plug chamber 154 of the hub 130.

After loading the plug 134 into the plugging mechanism 132 of the hub 130, the clamping mechanism 110 is moved from the closed position to the open position. With reference to FIG. 7, with the clamping device 122 in an unclamped position, the second movable jaw 112b may be pivotally moved relative to the body 102 and the first jaw 112a in the direction of arrow A about the pivot axis defined by the first pivot point 118. Such movement opens the movable jaws 112a, 112b to permit insertion of the tool 100 around the utility service line 200.

With reference to FIG. 7, when the tool 100 is fitted around the utility service line 200, the second movable jaw 112b may be pivotally moved relative to the body 102 and the first jaw 112a in the direction of arrow A to close the jaws 112a, 112b around the utility service line 200. In order to secure the second movable jaw 112b relative to the body 102, the threaded shaft 124 of the clamping device 122 is pivoted in a direction away from the second movable jaw 112b such that the second end 116 of the second movable jaw 112b can be moved to the closed position against the body 102. Once the second movable jaw 112b is in the closed position, the threaded shaft 124 is pivoted in a reverse direction toward the second movable jaw 112b such that the threaded shaft 124 is received in the slot 120 of the second movable jaw 112b (shown in FIG. 8). The nut 126 on the threaded shaft 124 is tightened by rotating it in a direction of arrow B to clamp the second movable jaw 112b in the closed position between the nut 126 and the body 102 of the tool 100.

Figure 9:
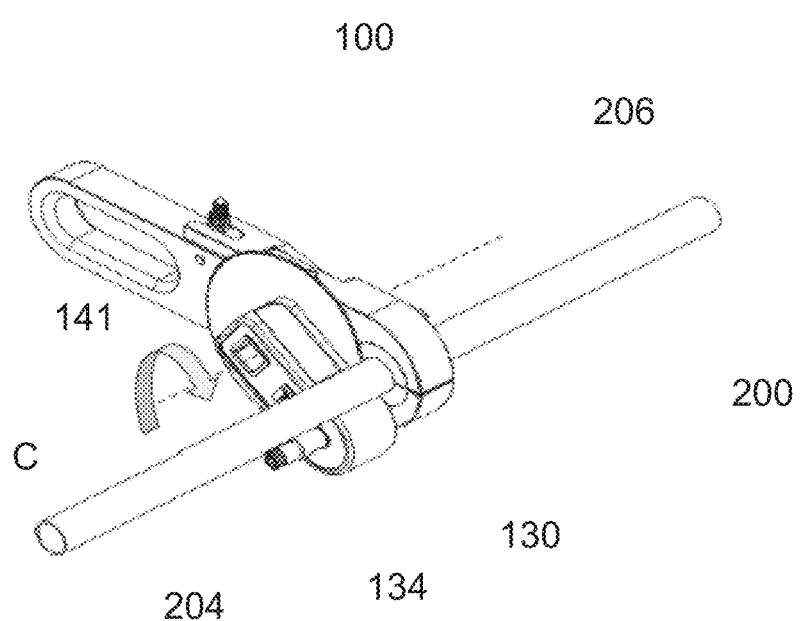
FIG. 9 is a right-side perspective view of the service tool of FIG. 1 shown in a start of cut position on a utility line.

With reference to FIG. 9, the cutting blade 128 is rotated about the cutting axis C' by engaging the input drive 140 on the rotatable shaft 136 (shown in FIG. 3) or the second input drive 141 on the hub 130 with the tool. Rotation of the cutting blade 128 about the cutting axis C' cuts the utility service line 200 due to engagement between the cutting blade 128 and the outer surface of the utility service line 200.

Figure 10:
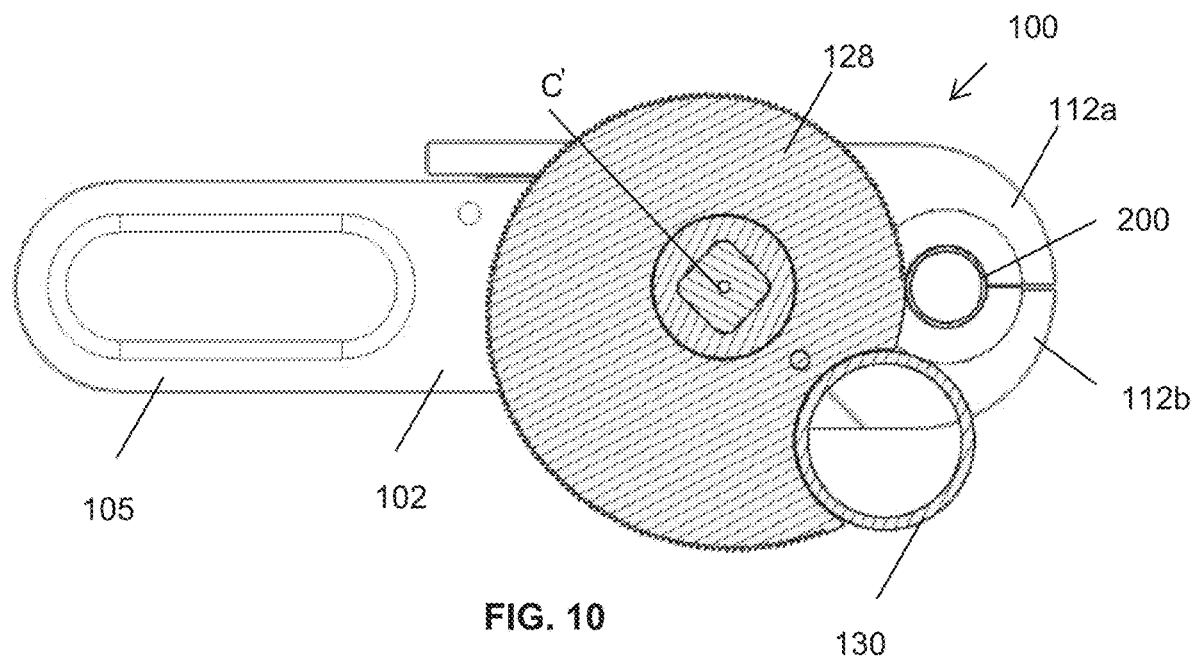
FIGS. 10-13 are side cross-sectional views of the service tool of FIG. 1 showing the position of the cutting blade at various positions relative to a utility line.
Figure 11:
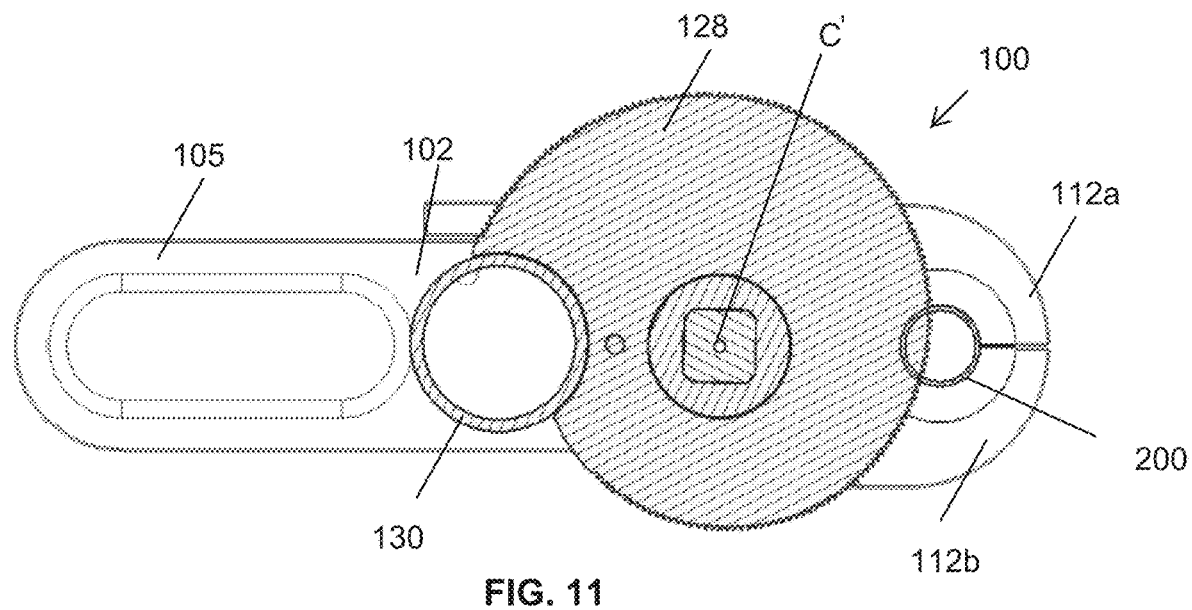
Figure 12:
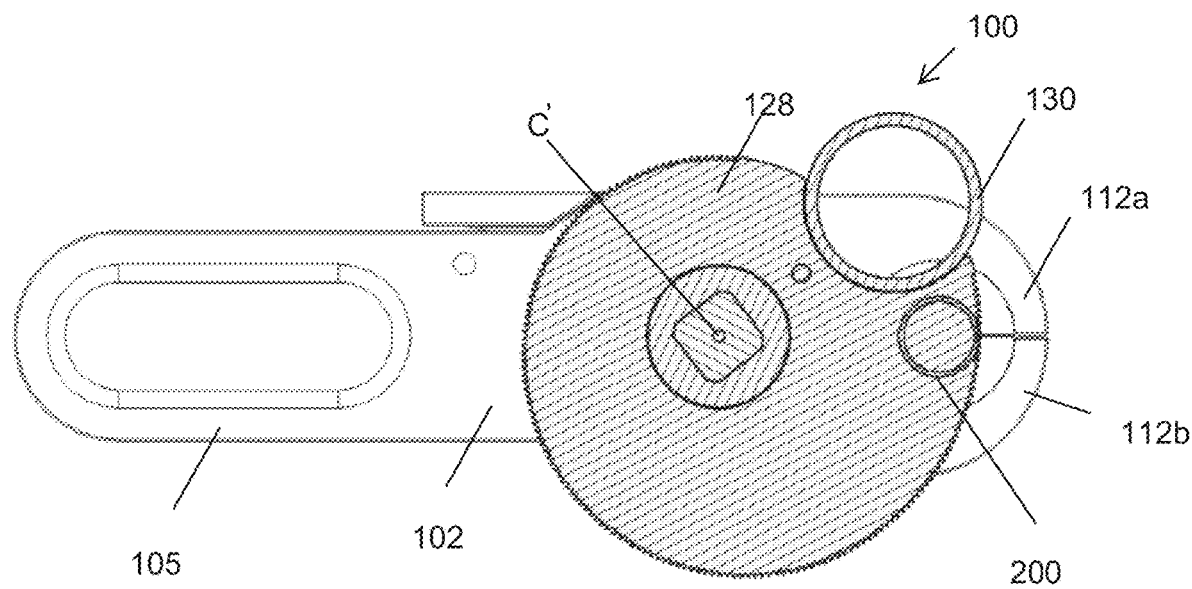
Figure 13:
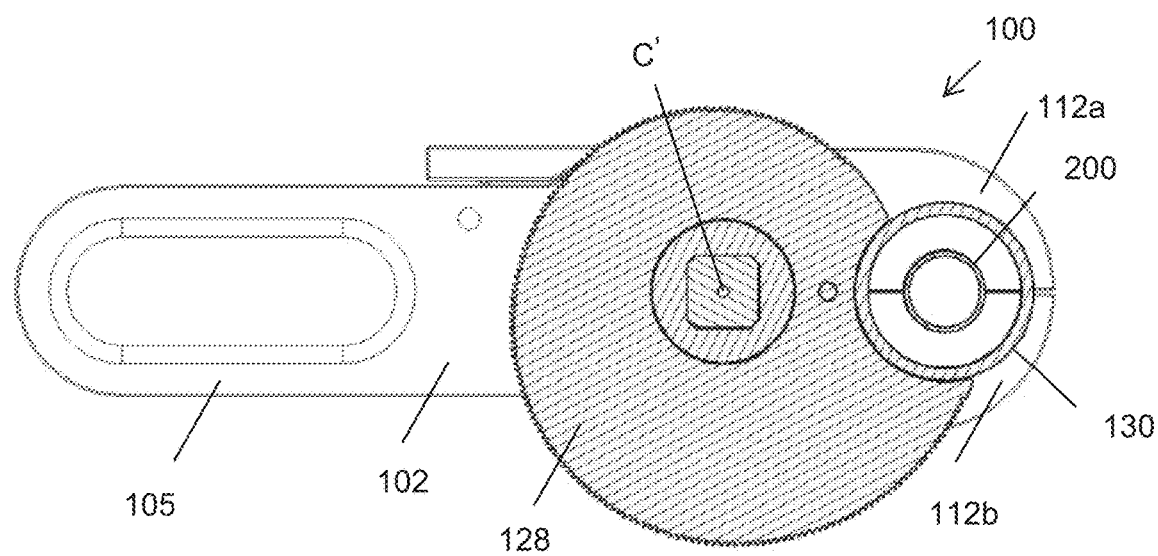

FIGS. 10-13 illustrate various positions of the cutting blade 128 relative to the utility service line 200 as the cutting blade 128 is rotated about the cutting axis C'. Initially, as shown in FIG. 10, the cutting blade 128 contacts an outer surface 220 of the sidewall of the utility service line 200. As the cutting blade 128 is rotated about the cutting axis C', the cutting teeth 129 of the cutting blade 128 cut deeper into the utility service line (FIGS. 11-12). As the cutting blade 128 cuts through the sidewall of the utility service line 200, the hub 130 contacts the first cut portion 204 of the utility service line 200 to displace the first cut portion 204 as it is cut from the second cut portion 206 (shown in FIG. 9).

Figure 14:
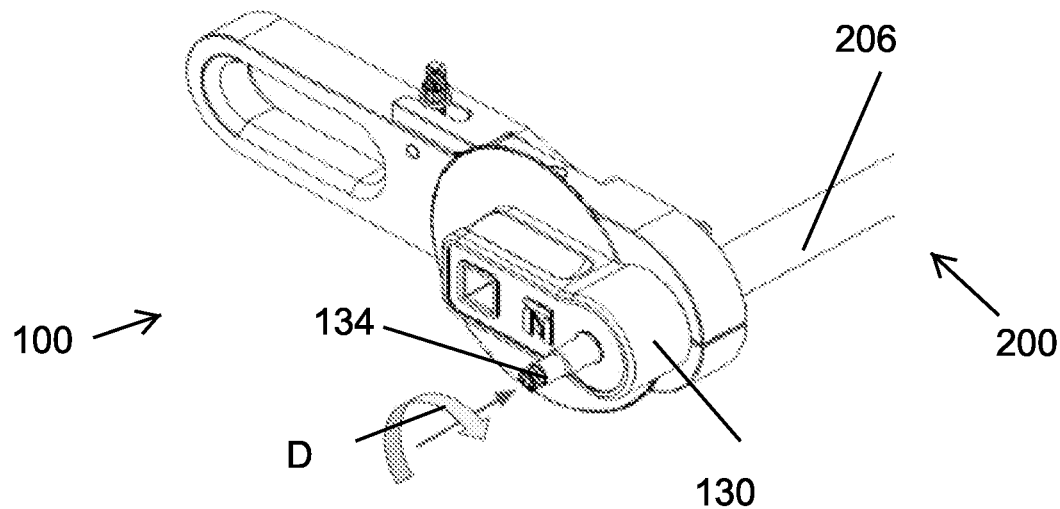
FIG. 14 is a right-side perspective view of the service tool of FIG. 1 showing a cut utility line and a plug in an uninstalled position.

With reference to FIG. 14, the hub 130 is aligned with the second cut portion 206 such that the plug 134 can be unthreaded from the hub 130 and into the second cut portion 206 (see, also, FIG. 5). Specifically, the second threads 168 on the exterior of the outer portion 162 of the plug 134 (shown in FIGS. 17-18) can be disengaged from the plug chamber 154 of the hub 130 (shown in FIG. 5) by rotating the plug 134 in a direction of arrow D in FIG. 14. Such movement releases the plug 134 from the plug chamber 154 of the hub 130 and inserts the plug 134 into the second cut portion 206 of the utility service line 200.

Figure 15:
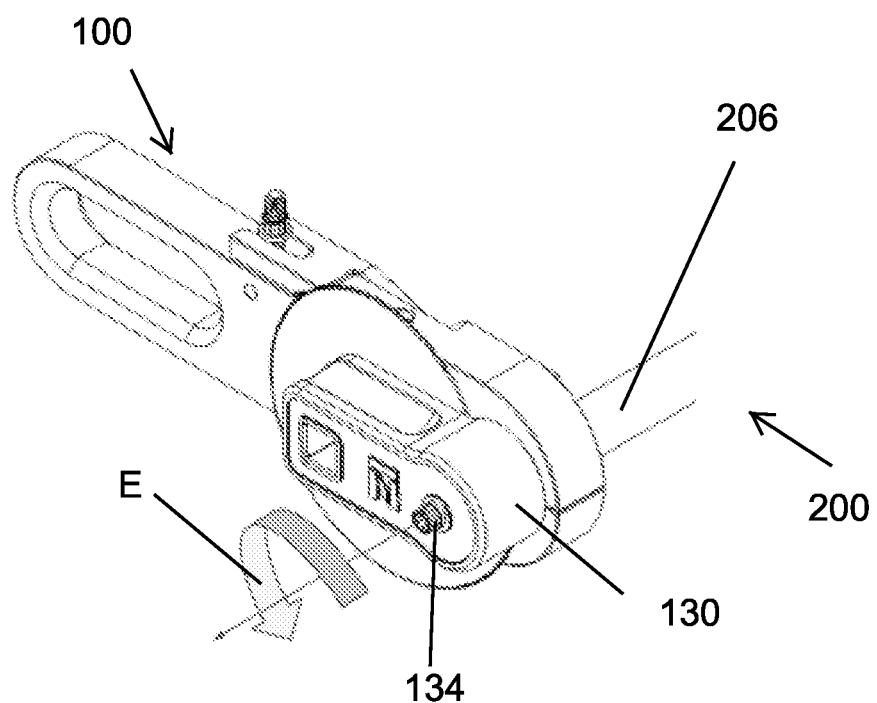
FIG. 15 is a right-side perspective view of the service tool of FIG. 1 showing a cut utility line and a plug in an installed position.

With reference to FIG. 15, after the plug 134 is inserted into the second cut portion 206 of the utility service line 200, the plug 134 is tightened to seal against the inner sidewall 208 (shown in FIG. 5) of the second cut portion 206 by rotating the inner portion 156 of the plug 134 relative to the outer portion 162 in a direction of arrow E such that the seal 160 is compressed therebetween and expands in a radially outward direction to engage the inner sidewall 208 of the second cut portion 206 (see FIG. 5).

Figure 16:
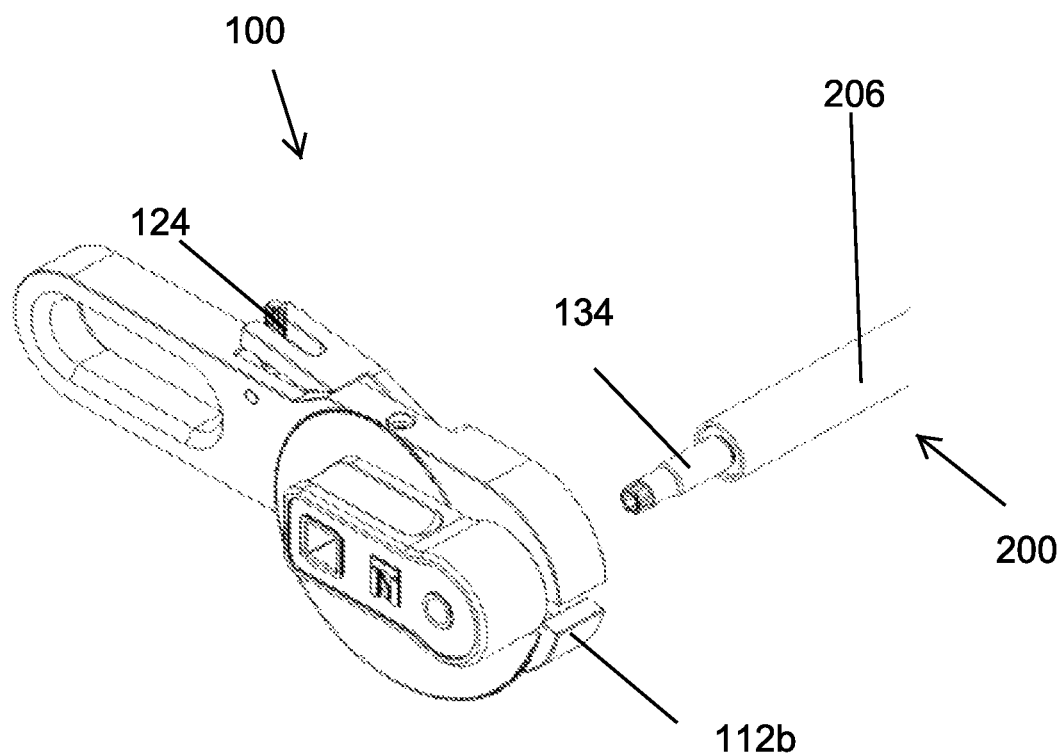
FIG. 16 is a right-side perspective view of the service tool of FIG. 1 showing a cut and plugged utility line.

With reference to FIG. 16, the tool 100 can be disconnected from the second cut portion 206 by unthreading the nut 126 (shown in FIG. 8) from the threaded shaft 124 and releasing the second movable jaw 112*b* from the second cut portion 206 of the utility service line 200. In this manner, the open end of the second cut portion 206 remains plugged such that upstream water supply is uninterrupted.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A service tool for cutting and plugging a utility service line, the service tool comprising:
    a body having a receiving portion configured to receive the utility service line;
    a clamping mechanism movable relative to the body and configured to clamp around at least a portion of an outer circumference of the utility service line when the utility service line is received in the receiving portion;
    a cutting blade adjacent to the receiving portion and configured to engage the outer circumference of the utility service line and cut the utility service line into a first cut portion and a second cut portion as the cutting blade is rotated about a cutting axis relative to the body; and
    a hub associated with the body, the hub comprising a plugging mechanism configured to contact and displace the first cut portion of the utility service line from the second cut portion and dispense a plug into the second cut portion of the utility service line.

2. The service tool according to claim 1, wherein the clamping mechanism comprises at least one jaw movable relative to the body between an open position and a closed position.

3. The service tool according to claim 2, wherein, in the closed position, the at least one jaw is configured to clamp around at least the portion of the outer circumference of the utility service line.

4. The service tool according to claim 2, wherein the clamping mechanism comprises a threaded drive shaft for moving the at least one jaw relative to the body between the open position and the closed position.

5. The service tool according to claim 1, further comprising a handle connected to the body, wherein the handle extends in a direction substantially perpendicular to a longitudinal axis of the receiving portion.

6. The service tool according to claim 1, wherein the hub is connected to the body via a rotatable shaft such that the hub is rotatable relative to the body with rotation of the shaft.

7. The service tool according to claim 6, wherein the rotatable shaft comprises an input drive.

8. The service tool according to claim 6, wherein the input drive is a keyed hole configured for receiving a corresponding protrusion on the tool.

9. The service tool according to claim 6, wherein the plugging mechanism comprises a plug chamber offset from the shaft, the plug chamber configured to receive the plug.

10. The service tool according to claim 9, wherein the hub is configured to contact the utility service line as the cutting blade is rotated about the cutting axis relative to the body to displace the first cut portion of the utility service line such that the plug chamber is aligned with the second cut portion of the utility service line.

11. The service tool according to claim 9, further comprising the plug disposed in the plug chamber of the plugging mechanism.

12. The service tool according to claim 11, wherein the plug is threadably received within the plug chamber.

13. The service tool according to claim 11, wherein the plug comprises an inner portion having a plug end with a seal configured for engaging an inner sidewall of the second cut portion of the utility service line and an outer portion threadably connected to a shaft of the inner portion protruding from the plug end.

14. The service tool according to claim 13, wherein the outer portion has first threads on an interior thereof configured for threadably connecting to the shaft of the inner portion and second threads on an exterior thereof for threadably connecting to the plug chamber of the plug mechanism.

15. A service tool for cutting and plugging a utility service line, the service tool comprising:
    a body having a receiving portion configured to receive the utility service line;
    a clamping mechanism movable relative to the body and configured to clamp around at least a portion of an outer circumference of the utility service line when the utility service line is received in the receiving portion;
    a cutting blade adjacent to the receiving portion and configured to engage the outer circumference of the utility service line and cut the utility service line into a first cut portion and a second cut portion as the cutting blade is rotated about a cutting axis relative to the body;
    a hub associated with the body, the hub comprising a plugging mechanism; and
    a plug received in the plugging mechanism and configured to be dispensed into the second cut portion of the utility service line,
    wherein the hub is configured to contact the utility service line as the body is rotated about the utility service line to displace the first cut portion of the utility service line from the second cut portion such that the plugging mechanism is aligned with the second cut portion of the utility service line.

16. The service tool according to claim 15, wherein the hub is connected to the body via a rotatable shaft such that the hub is rotatable relative to the body with rotation of the shaft.

17. The service tool according to claim 16, wherein the rotatable shaft comprises an input drive configured for connecting to a tool for rotating the rotatable shaft.

18. The service tool according to claim 15, wherein the plugging mechanism comprises a plug chamber offset from the shaft, the plug chamber configured to receive the plug.

19. The service tool according to claim 15, wherein the plug comprises an inner portion having a plug end with a seal configured for engaging an inner sidewall of the second cut portion of the utility service line and an outer portion threadably connected to a shaft of the inner portion protruding from the plug end.

20. The service tool according to claim 19, wherein the outer portion has first threads on an interior thereof configured for threadably connecting to the shaft of the inner portion and second threads on an exterior thereof for threadably connecting to the plug chamber of the plug mechanism.

* * * * *